May 13, 1924.
P. S. MOYER
HYDROMETER
Filed March 30, 1922
1,493,941
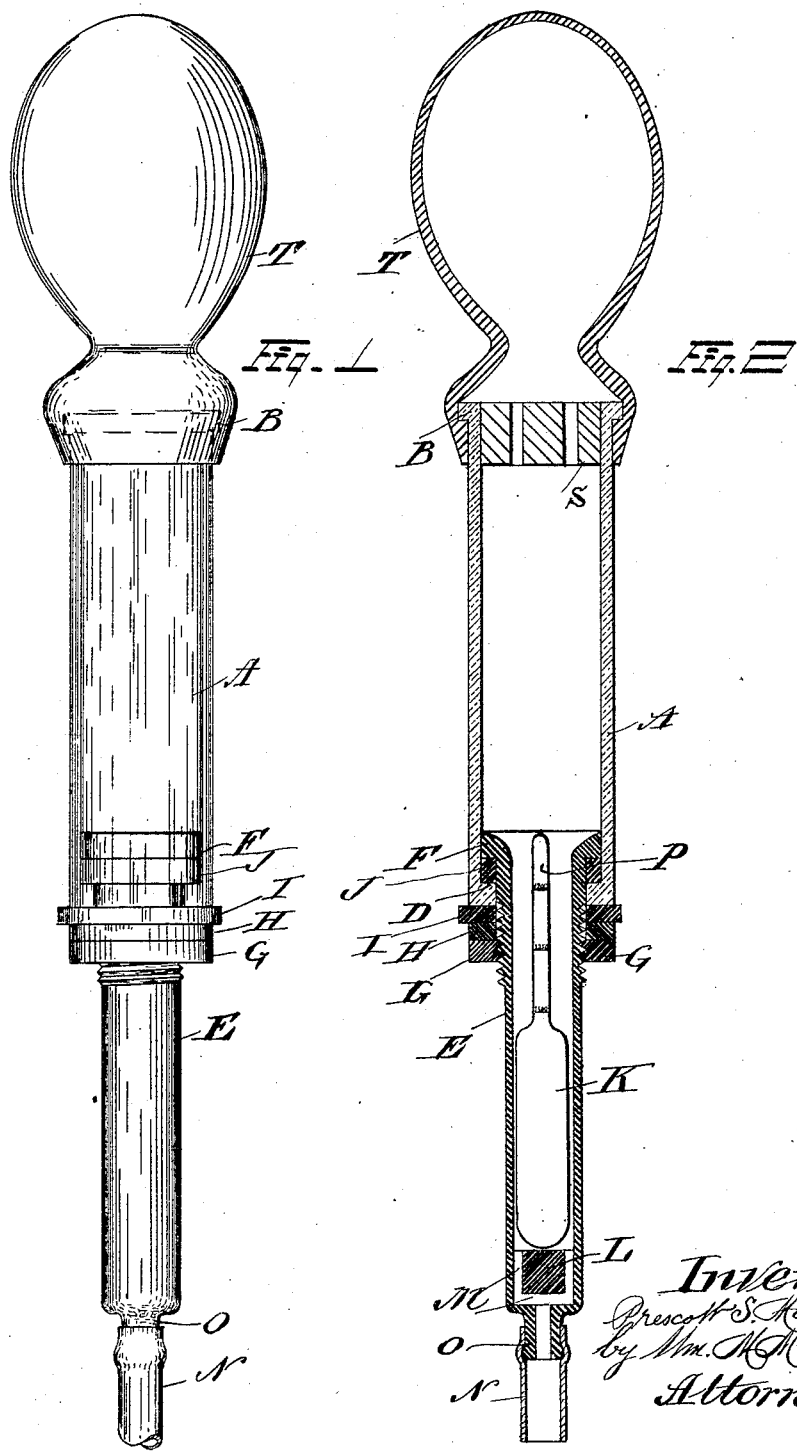

Patented May 13, 1924.

1,493,941

UNITED STATES PATENT OFFICE.

PRESCOTT S. MOYER, OF EAST CLEVELAND, OHIO.

HYDROMETER.

Application filed March 30, 1922. Serial No. 548,125.

*To all whom it may concern:*

Be it known that I, PRESCOTT S. MOYER, a citizen of the United States, and resident of East Cleveland, in the county of Cuyahoga and State of Ohio, have invented certain new and useful Improvements in Hydrometers, of which I hereby declare the following to be a full, clear, and exact description, such as will enable others skilled in the art to which it appertains to make and use the same.

The objects of the invention are to provide an improved form of hydrometer, which is so constructed that it will function with a relatively small amount of the liquid to be tested, and hence will be useful in testing the specific gravity of fluids in batteries, from which only a small amount of fluid can be withdrawn for use in the chamber of the instrument, when it is required to test the state of the charge. Also the instrument is so constructed that a correct reading may be taken as soon as the liquid appears in the transparent portion of the testing chamber.

The device is also so constructed that the float indicator will not become tilted and jammed or adhere to the side of the transparent chamber, although a very small amount of liquid has been employed to produce the proper reading.

It includes a transparent chamber formed of drawn tubing which will be of uniform dimensions throughout, and will have perfectively straight sides. To this chamber is attached an opaque guide chamber in which the float indicator operates and is of less diameter than the transparent portion.

An important advantage of this construction is found in the fact, that since the liquid does not rise high in the transparent chamber in order to obtain a reading therein, there is no danger of the interior surface becoming clouded by contact therewith, and if such defect should occur it can easily be cleaned by removing the elastic bulb at the top.

The approximated extremities of the transparent and opaque portions of the chamber are also hermetically attached together and rigidly clamped, and are easily assembled and separated from each other for cleaning and shipment, and owing to the cylindrical shape of the transparent member and the use of nonfragile material for the guide or float chamber, the device becomes durable in use.

The device is hereinafter more fully described, illustrated in the accompanying drawings and specifically pointed out in the claims.

In the accompanying drawings, Fig. 1 is a side elevation of the invention.

Fig. 2 is a vertical central section thereof. In these views A is a transparent cylinder formed of drawn glass, and having its upper end flanged outwardly at B. To this end the elastic bulb C is attached.

The lower end of the cylinder is flanged inwardly at D, to permit the attachment of a combined guide and float chamber E having an outwardly turned flange F at its upper end.

The chambers are secured together by means of the nut G, and the hard and soft washers, H and I and inner soft gasket J, to exclude liquid and air, thus hermetically sealing the joint.

The lower or float portion E may be formed of hard rubber or celluloid or other acid resisting opaque material, and serves as a guide for the float indicator K movable vertically therein.

A cushioned base L is inserted at the bottom of the float chamber to prevent injury to the delicate float, and is provided with circulating passages M.

N is the draw tube attached to a terminal nipple O.

A perforated stopper S in the outer end of the transparent tube prevents the hydrometer float from accidentally falling into the bulb, T.

In operation, when the liquid is drawn into the transparent chamber, to a point where it is first visible, the specific gravity of the liquid can be read upon the indicator tube P, for the reason that the float chamber is constructed of such length it is not necessary that the float should rise above that point to make the reading visible upon the hydrometer float.

To permit this result the relative sizes of the float and float chamber are predetermined and constructed accordingly, and the float is completely enclosed within the float chamber and is not visible until it rises therein.

Having described the invention what I claim as new, and desire to secure by Letters Patent is:

1. A hydrometer requiring the use of a small amount of fluid for testing purposes, comprising, a cylindrical transparent upper chamber and a combined float and guide chamber therefor of predetermined less diameter, said combined float and guide chamber being formed of opaque and acid resisting material, said float chamber being inserted in the lower end of said upper chamber.

2. In a hydrometer, an upper cylindrical transparent chamber outwardly flanged at its upper end, and inwardly flanged at its lower end, an elastic bulb secured to the upper end thereof, a lower combined float and guide chamber inserted in the lower end of said upper chamber and outwardly flanged at its upper end, a hydrometer float in said lower chamber, a clamping nut and washers upon said lower chamber and a gasket interposed between the opposed flanges of said upper and lower chambers.

In testimony whereof, I hereunto set my hand this 14" day of Mch., 1922.

PRESCOTT S. MOYER.

In presence of—
 WM. M. MONROE,
 M. S. CERREZIN.